United States Patent [19]

Siciliano

[11] Patent Number: 4,841,909

[45] Date of Patent: Jun. 27, 1989

[54] POULTRY CAGE

[75] Inventor: Anthony J. Siciliano, South Lyon, Mich.

[73] Assignee: Big Dutchman, New Holland, Pa.

[21] Appl. No.: 65,266

[22] Filed: Jun. 22, 1987

[51] Int. Cl.⁴ .............................................. A01K 31/00
[52] U.S. Cl. ....................................................... 119/17
[58] Field of Search ..................... 119/17, 22, 21, 62, 119/63, 61

[56] References Cited

U.S. PATENT DOCUMENTS 1,181,740  5/1916  Clark ..................................... 119/63
3,244,146  4/1966  Kurtz et al. ........................... 119/17
3,738,324  6/1973  Keen et al. ......................... 119/61 X Primary Examiner—Robert Peshock
Assistant Examiner—R. Thomas Price
Attorney, Agent, or Firm—Price, Heneveld, Cooper, DeWitt & Litton

[57] ABSTRACT

An enclosure for poultry is described which has a feeding floor with openings to allow the feeding of the poultry housed therein. The enclosure is provided with a partition which is used to change the effective size of the openings through which the birds gain entry to the feed trough. Smaller openings, suitable for small birds and large openings, suitable for larger birds, are thus provided. When not in use, the partition is pivoted to a vertical position, away from the cage floor so that it does not interfere with the movement of the birds.

6 Claims, 2 Drawing Sheets

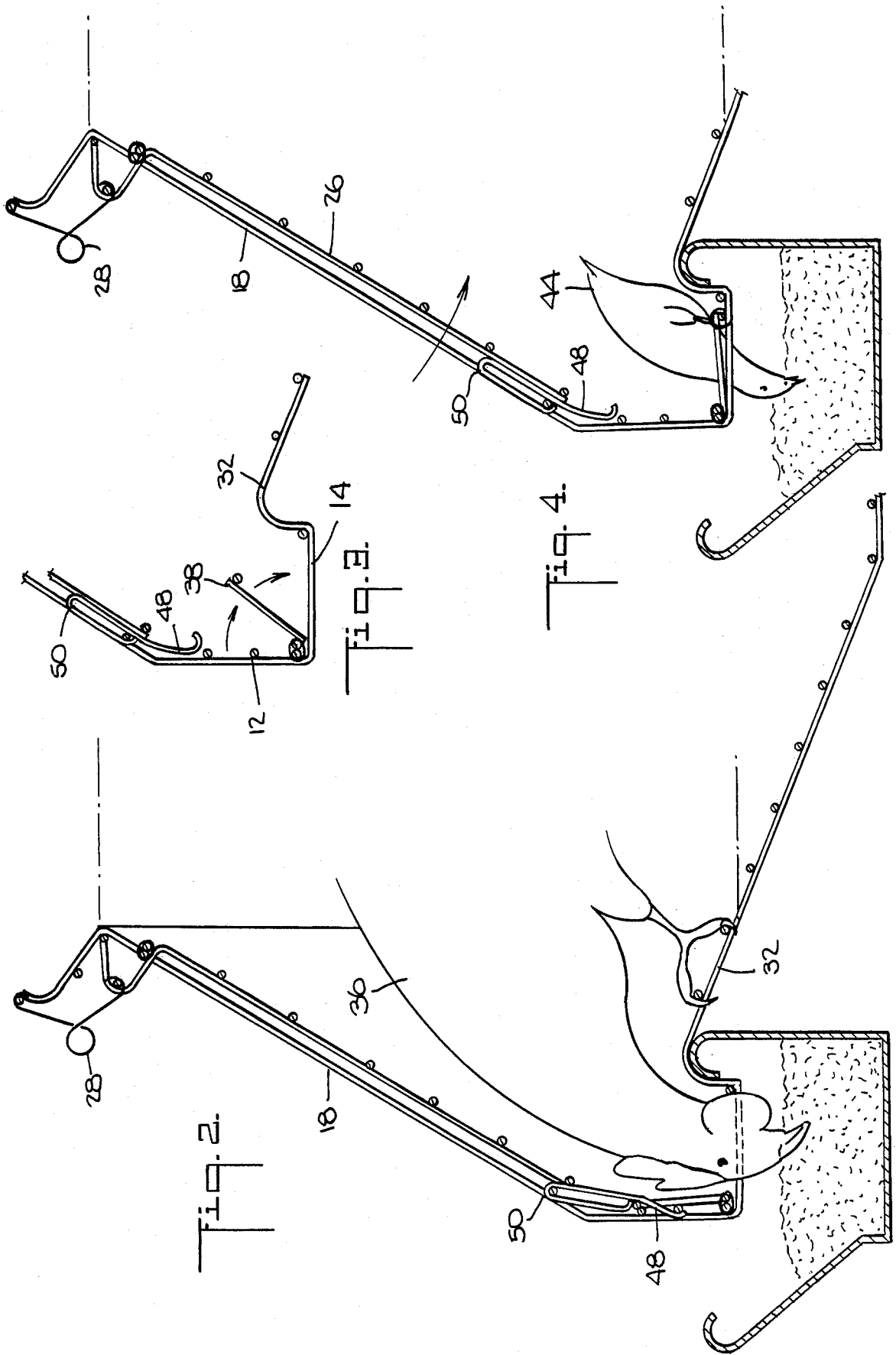

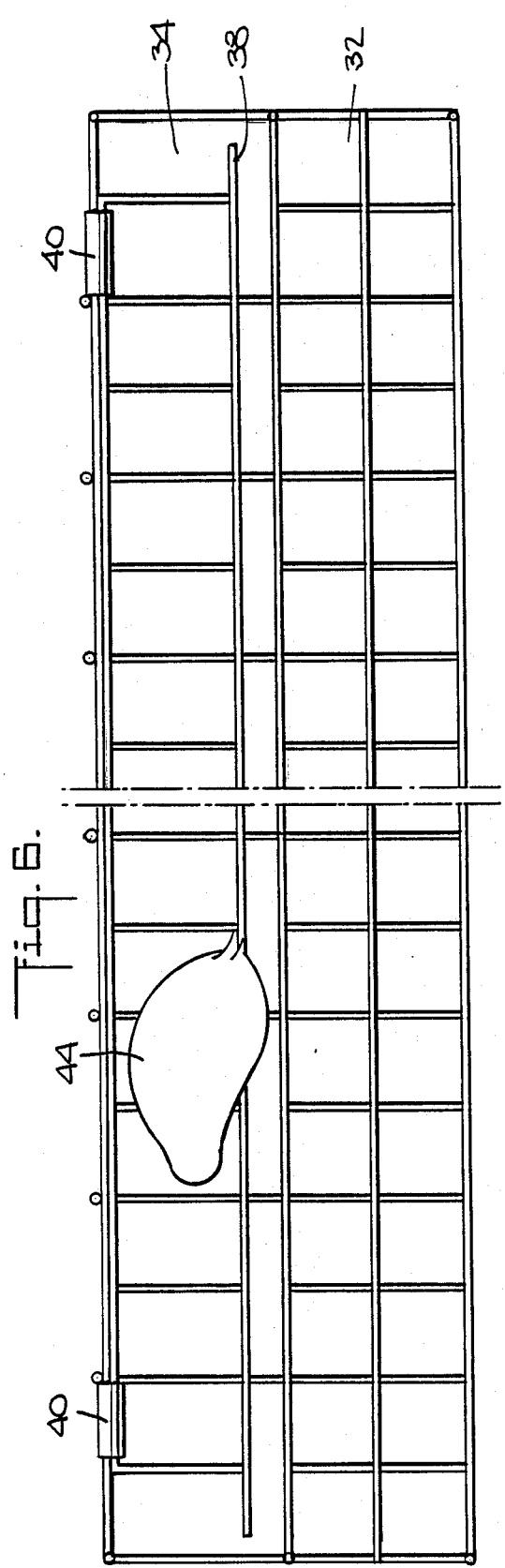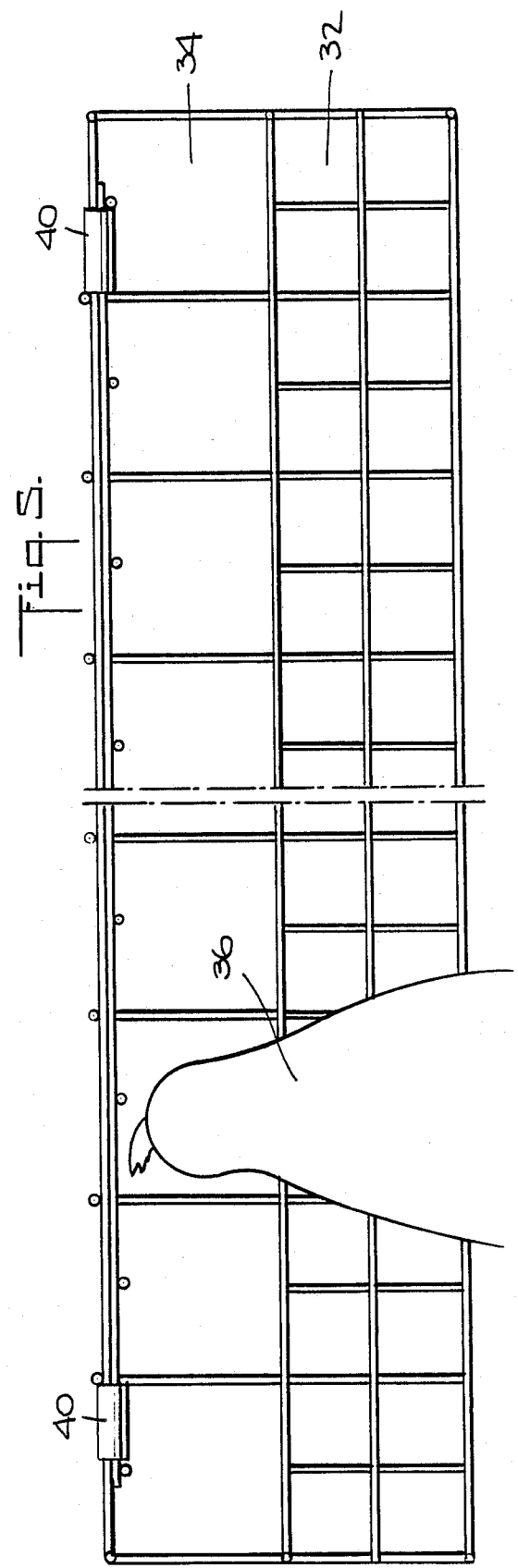

POULTRY CAGE

BACKGROUND OF THE INVENTION a. Field of Invention

This invention pertains to an improved enclosure for housing poultry and more particularly to an enclosure which is particularly suited for housing poultry of different ages and/or sizes.

b. Description of the Prior Art

Enclosures are known which may be used for housing poultry of a variety of sizes depending on the age of the birds, their species and so forth. Typically these enclosures are built so that they allow the birds access to a feeding trough which is periodically filled with food and disposed on the front portion of the cage. The enclosures are designed with openings or access holes which permit the birds to extend their heads out of the enclosure sufficiently to reach the food disposed in the feeding trough. It has been found, however, that access holes of a predetermined size are not always effective because if the hole was large enough to allow access for the larger birds then smaller birds could fall through or escape from the enclosure. On the other hand a small access hole which is suitable to contain smaller birds is too small for the necks of the larger birds.

A solution to this problem is described in commonly assigned U.S. Pat. No. 3,738,324 to Keen and Siciliano. In this reference, an enclosure is provided for poultry which has a floor area substantially coextensive with its length. The enclosure includes a plurality of walls made of grills of relatively stiff metallic wires. The forwardmost portion of floor area is positioned above the feeding trough and is made of a grill member with access holes sized for relatively large birds. The enclosure is provided with a partition which may be pivoted between two relatively horizontal positions. In a first position, the partition overlaps the floor and includes a plurality of rods which are positioned so that in the overlapping position, the rods reduce the effective size of the access holes thereby allowing the use ot the enclosure for smaller birds. When the partition is pivoted to its second horizontal position away from the access holes, the access holes are left uncovered.

One problem associated with the enclosure described above has been that when the partition is pivoted away from the feeding floor, the partition interferes with the movement of the birds since their feet tend to get caught in the partition rods or in the spaces between the partition rods and the grill which forms the enclosure. As a result the birds may be frequently injured. In addition, the prior art partition is was accessible only by opening the cage enclosure, thereby possibly disturbing the birds.

OBJECTIVES AND SUMMARY OF THE INVENTION

It is an objective of the present invention to provide an enclosure for housing poultry which can be used safely for birds of a variety of sizes.

Another objective of the invention is to provide an enclosure which can be changed from one configuration to another with minimal disturbance to the birds already housed in the enclosure.

A further objective is to provide an enclosure which can be changed from one configuration to another easily and effectively.

An enclosure constructed in accordance with this invention comprise a front wall extending substantially vertically with a substantially horizontal floor connected to a lower portion of the vertical wall. As its forward portion, the floor is provided with a plurality of access holes which are sized to allow relatively large birds to extend their heads through the floor toward a feeding trough disposed below the forwardmost portion of the floor. A partition is attached to the enclosure by pivoting means which allow the partition to pivot between a first position in which the partition is substantially coextensive with the floor in a horizontal position, and a second position in which the partition is substantially vertical and is disposed adjacent to the front wall. Means are also provided for latching the partition in at least the second position.

BRIEF DESCRIPTION OF THE DRAWINGS

FIG. 2 shows a side sectional view of the enclosure of FIG. 1 with the pivotal partition in a vertical, or inactive position;

FIG. 3 shows the partition of FIG. 2 being pivoted to the horizontal position;

FIG. 4 shows the partition of FIGS. 2 and 3 in the horizontal position;

FIG. 5 shows a plan view of the floor of the enclosure of FIG. 1 with the partition in the horizontal position; and FIG. 6 shows a plan view of the floor of the enclosure without the partition.

DETAILED DESCRIPTION OF THE INVENTION

Figure 1:
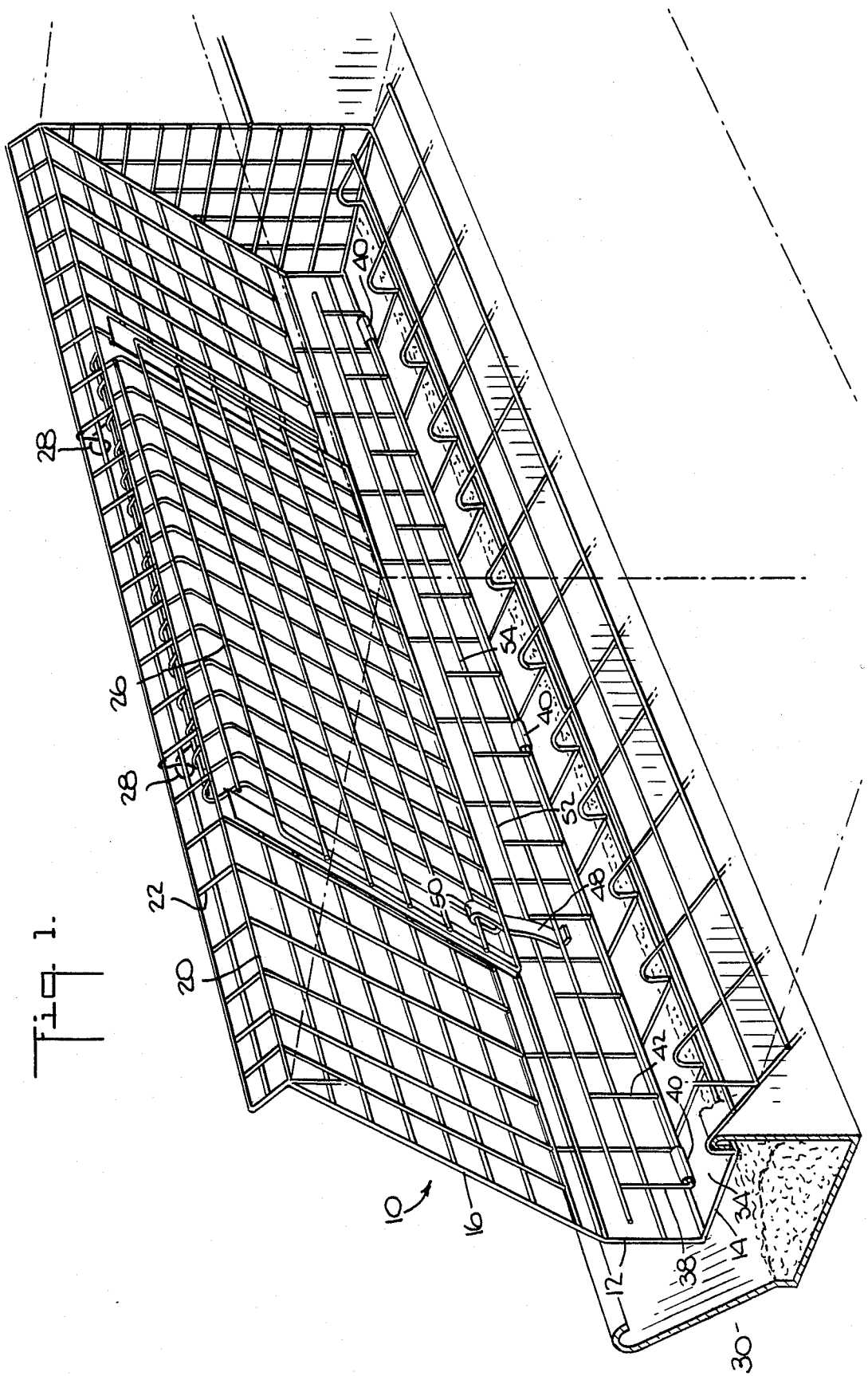
FIG. 1 shows the a sectional orthogonal view of a poultry enclosure constructed in accordance with this invention.

Referring to the drawings, particularly FIG. 1, an enclosure for poultry constructed in accordance with the invention includes a front portion 10 which is formed by a front wall 12, which is substantially vertical, floor 14 which is substantially horizontal, and a side wall 16 extending rearwards into the enclosure and upwards from the floor 14. Inclined wall 16 has an upper edge 20 which connects the inclined wall to roof 22 of the enclosure. A rectangular hole 24 is made through wall 16 for gaining access into the enclosure. Access hole 24 is normally covered by a trap door 18. Preferably trap door 18 is pivotally secured to the upper edge 20 so that it may swing inward as shown in FIG. 4. Trap door 18 is maintained in the closed position, i.e., against inclined wall 16, by a pair of tension springs 28.

As shown in FIG. 1, feeding floor 14 is disposed with its forwardmost portion directly above a feeding trough 30. Leading to feeding floor 14 there is a ramp 32 which allows the birds to approach the feeding floor 14 from the interior of the enclosure. Floor 14 is provided with a plurality of access holes 34. Holes 34 are appropriately sized to allow a relatively large bird 36, such shown in FIG. 2, to approach feeding floor 14 and, while it is pirched on ramp 32, to extend its neck through one of the access holes 34 toward the feeding trough.

The enclosure also includes a partition 38, which in FIG. 1 is shown disposed adjacent to and parallel to front wall 12. Partition 38 is secured to the enclosure, and more particularly to the junction between front wall 12 and feeding floor 14 by a plurality of hinging members 40. Hinging members 40 allow partition 38 to pivot back and forth between a vertical position as shown in FIGS. 1 and 2, and a horizontal position as shown in FIGS. 4 and 6. In the horizontal position partition 38 overlaps feeding floor 14. Advantageously, partition 38 has a plurality of rods 42 disposed in such a manner that when partition 38 is in its horizontal position, the rods at least partially obstruct access holes 32. Therefore, when partition 38 is in its vertical or inactive position it does not interfere with the feeding of a large size bird 36. When the partition 38 is in its horizontal position, it allows a smaller bird 44 to extend its neck through the now-restricted access holes 32. Rods 42 restrict holes 32 sufficiently so that the smaller birds 44 (shown in FIGS. 4 and 6) will not fall through but are still enabled access to the feed trough.

While the various elements of the enclosure can be made of any type of stock material, it is preferable that they should be made from relatively rigid metallic or nonmetallic wires which can be layed out in a lattice and joined by soldering or other means at the junction points to form appropriate sized grids. Furthermore, this type of structure is advantageous because it is relatively strong, it is easy to maintain and keep sanitary. In addition, the interstices between the wires allow sufficient air and light entry into the enclosure for the health and comfort of the birds.

If a lattice or grill structure is used for the elements of the enclosure, the hinging means 40 are preferably sleeves as shown in FIG. 1.

In order to insure that trap door 26 remains in the closed portion and that partition 38 is maintained in the vertical position as required, a latching member is provided as shown in FIG. 1. Latching member 48 is made of a relatively rigid but slightly flexible material so that it can spring back to its original shape after a slight deformation. Latching member 48 is in a form a strap with a hoop 50 at its upper end which secures the strap to trap door 26. In its normal position, latching member 48 extends downward from trap door 26, passes over a horizontal wire 52 of partition 38 and bends outward of the enclosure to engage a horizontal wire 54 of front wall 12. Thus, strap 48 simultaneously latches the trap door in its closed position and also maintains partition 38 in its vertical position. Latching member 48 can be deformed to disengage from horizontal wire 54 thereby releasing both partition 38 and trap door 26. Of course, latching member 48 can maintain the trap door latched even with partition 38 in the horizontal position.

The manner of the operation of the enclosure is as follows. For relatively large birds, partition 38 is stowed or kept in the vertical position by latching member 48. In this position, partition 38 does not interfere in any way with the movement or feeding of the birds. It should be noted that if partition 38 is disposed horizontally within the enclosure away from the feeding floor it would not only interfere with the birds as previously mentioned, but it would be instrumental in the collection of additional refuse at the bottom of the enclosure. However, refuse does not collect on partition 38 while it is stowed in the vertical portion. For smaller birds, latch 48 is disengaged from the outside to permit partition 38 to be pivoted to its horizontal position. Thus, partition 38 can be moved to its operational position with minimal interference with the birds within the enclosure.

In the foregoing specifications, the invention has been described with reference to specific exemplary embodiments thereof. It will, however, be evidence that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a cage enclosure for housing birds of different sizes said enclosure being constructed of wire grid members providing openings therebetween, said enclosure including a front wall having an access opening and an enclosure member for closing said access opening and a floor extending rearwardly from said front wall; said floor comprising a substantially horizontally feeding floor portion disposed above a feeding trough and being provided with a plurality of feed openings of a first size and a support floor portion extending rearwardly from said feeding floor portion; an elongated partition pivotable between a first portion in which said partition cooperates with said feeding floor to change the feed openings to a second size, and a second position in which the partition is away from said feeding floor; the improvement comprising:

means for pivotally mounting said partition along one of its elongated edges proximate to the juncture between said front wall and feeding floor portion whereby birds of smaller size can feed through the feed openings when the partition is pivoted downwardly to said first position, and birds of a larger size can be feed through said feed openings when said partition is pivoted upwardly to said second position, said partition in said first position laying flat on said feeding floor portion and in said second position being located against said front wall;

latching means on said front wall for latching said partition against said front wall out of interference with the movement of birds on said support floor portion, out of position for deposits of bird droppings and out of interference with the feeding of the birds in said cage; said latching means being accessible from outside of the cage through the openings between said wire grid members so as to be releasable without openings said enclosure member.

2. The enclosure of claim 1 wherein said second size is smaller than said first size.

3. The enclosure of claim 1 wherein said partition includes a plurality of rods which overlap said feed openings when said partition is in said first position to reduce the size of said openings.

4. The enclosure of claim 1 wherein said feeding floor comprises a plurality of wires and said feed openings are formed by interstices between the wires.

5. An enclosure for holding birds of various sizes comprising:

(a) a substantially vertical wall;
(b) a substantially horizontal feeding floor extending inwardly from said vertical wall, said feeding floor having a plurality of feed openings;
(c) a partition having an edge pivotally secured proximate to the juncture of said wall and floor, said partition being pivotable between a first and a second position, said partition being superimposed over said foor in said first position to reduce the size of said feed openings, said partition being substantially vertical in said second position;
(d) latching means for latching said partition in said second position;
(e) an access opening for the insertion and removal of birds from the enclosure, and a door covering said access hole; and
(f) said latching means also latching said door in closed position.

6. The enclosure of claim 5 wherein said floor, wall, and partition are made of wire grids.

* * * * *

UNITED STATES PATENT AND TRADEMARK OFFICE
CERTIFICATE OF CORRECTION

PATENT NO. : 4,841,909

DATED : June 27, 1989

INVENTOR(S) : Anthony J. Siciliano

It is certified that error appears in the above-identified patent and that said Letters Patent is hereby corrected as shown below:

Col. 2, line 2;
    "comprise" should be --comprises--;

Col. 2, line 4;
    "As" should be --At--;

Col. 2, line 19;
    After "shows" insert --a--;

Col. 4, claim 1, line 9;
    "horizontally" should be --horizontal--;

Col. 4, claim 1, line 14;
    "portion" should be --position--;

Col. 4, claim 1, line 24;
    "can be feed" should be --can feed--;

Col. 4, claim 1, line 37;
    "openings" should be --opening--.

Signed and Sealed this

Thirtieth Day of October, 1990

*Attest:*

HARRY F. MANBECK, JR.

*Attesting Officer*      *Commissioner of Patents and Trademarks*